United States Patent
Ji et al.

(10) Patent No.: US 9,735,946 B2
(45) Date of Patent: *Aug. 15, 2017

(54) SUBFRAME DEPENDENT PHYSICAL UPLINK CONTROL CHANNEL (PUCCH) REGION DESIGN

(71) Applicant: QUALCOMM Incorporated, San Diego, CA (US)

(72) Inventors: Tingfang Ji, San Diego, CA (US); Wanshi Chen, San Diego, CA (US); Durga Prasad Malladi, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

This patent is subject to a terminal disclaimer.

(21) Appl. No.: 14/518,172

(22) Filed: Oct. 20, 2014

(65) Prior Publication Data
US 2015/0063262 A1    Mar. 5, 2015

Related U.S. Application Data

(63) Continuation of application No. 13/071,413, filed on Mar. 24, 2011, now Pat. No. 8,873,439.
(Continued)

(51) Int. Cl.
*H04L 5/00* (2006.01)
*H04W 72/04* (2009.01)
(Continued)

(52) U.S. Cl.
CPC ............ *H04L 5/0073* (2013.01); *H04L 5/003* (2013.01); *H04L 5/0007* (2013.01);
(Continued)

(58) Field of Classification Search
None
See application file for complete search history.

(56) References Cited

U.S. PATENT DOCUMENTS

| | | |
|---|---|---|
| 2009/0257390 A1 | 10/2009 | Ji et al. |
| 2010/0054203 A1 | 3/2010 | Damnjanovic et al. |
| | (Continued) | |

FOREIGN PATENT DOCUMENTS

| | | |
|---|---|---|
| JP | 2005117579 A | 4/2005 |
| WO | WO-2009129261 A1 | 10/2009 |
| | (Continued) | |

OTHER PUBLICATIONS

CMCC: "UL ACK/NAK and CQI feedback in Carrier Aggregation", 3GPP Draft; R1-094037 UL ACK-NACK and CQI Feedback in Carrier Aggregation, 3rd Generation Partnership Project (3GPP), Mobile Competence Centre ; 650, Route Des Lucioles ; F-06921 Sophia-Antipolis Cedex ; France, no. Miyazaki; Oct. 12, 2009, Oct. 12, 2009 (Oct. 12, 2009), XP050388524, [retrieved on Oct. 8, 2009].
International Search Report and Written Opinion—PCT/US2011/030083—ISA/EPO—Jul. 26, 2011.
Panasonic: "PUCCH resource indication for carrier aggregation and SORTD," 3GPP TSG-RAN WG1#60, R1-101252, Feb. 26, 2010.

*Primary Examiner* — Candal Elpenord
*Assistant Examiner* — Adam Duda

(57) ABSTRACT

According to certain aspects, resources allocated to a user equipment (UE) for physical uplink control channel (PUCCH) transmissions may be determined in a subframe-type dependent manner. As a result, PUCCH regions for different subframes may vary based on the subframe types.

30 Claims, 12 Drawing Sheets

Related U.S. Application Data

(60) Provisional application No. 61/317,652, filed on Mar. 25, 2010.

(51) Int. Cl.
*H04W 52/24* (2009.01)
*H04W 48/08* (2009.01)

(52) U.S. Cl.
CPC .......... *H04L 5/0016* (2013.01); *H04L 5/0058* (2013.01); *H04W 52/244* (2013.01); *H04W 72/042* (2013.01); *H04W 72/0413* (2013.01); *H04W 72/0446* (2013.01); *H04W 48/08* (2013.01)

(56) References Cited

U.S. PATENT DOCUMENTS

2010/0309876 A1   12/2010  Khandekar et al.
2011/0235602 A1    9/2011  Ji et al.

FOREIGN PATENT DOCUMENTS

| WO | WO-2010006289 | | 1/2010 |
|---|---|---|---|
| WO | WO-2010018942 | A2 | 2/2010 |
| WO | WO-2010019902 | | 2/2010 |
| WO | WO-2010025249 | A1 | 3/2010 |
| WO | WO-2010110598 | A2 | 9/2010 |
| WO | WO-2010141913 | A2 | 12/2010 |

SUBFRAME DEPENDENT PHYSICAL UPLINK CONTROL CHANNEL (PUCCH) REGION DESIGN

CROSS-REFERENCE TO RELATED APPLICATIONS

This application is a continuation of U.S. application Ser. No. 13/071,413, filed on Mar. 24, 2011, assigned U.S. Pat. No. 8,873,439 with an issue date of Oct. 28, 2014, which claims priority to U.S. Provisional Application Ser. No. 61/317,652, entitled SUBFRAME DEPENDENT PHYSICAL UPLINK CONTROL CHANNEL (PUCCH) REGION DESIGN, filed on Mar. 25, 2010, both of which are expressly incorporated by reference herein in their entireties.

BACKGROUND

I. Field

The present disclosure generally relates to communication and, more specifically, to techniques for managing interference by controlling transmission power.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that may support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data to one or more UEs on the downlink and may receive data from one or more UEs on the uplink. On the downlink, a data transmission from the base station may observe interference due to data transmissions from neighbor base stations. On the uplink, a data transmission from a UE may observe interference due to data transmissions from other UEs communicating with the neighbor base stations. For both the downlink and uplink, the interference due to the interfering base stations and the interfering UEs may degrade performance.

SUMMARY

According to certain aspects, a method for allocating uplink resources in a wireless communications network is provided. The method generally includes determining an allocation of physical uplink control channel (PUCCH) resources of a subframe for a physical uplink control channel (PUCCH), wherein at least one of a location and a size of a region of PUCCH resources allocated for the subframe is dependent on a subframe type and subframe types comprise at least a first type in which transmissions in a first cell are protected by restricting transmissions in a second cell and transmitting, in the subframe, information to a base station of the first cell using the allocated PUCCH resources for that subframe type.

According to certain aspects, a method for allocating uplink resources in a wireless communications network is provided. The method generally includes determining an allocation of physical uplink control channel (PUCCH) resources of a subframe for a physical uplink control channel (PUCCH), wherein at least one of a location and a size of a region of PUCCH resources allocated for the subframe is dependent on a subframe type and subframe types comprise at least a first type in which transmissions in a first cell are protected by restricting transmissions in a second cell and signaling the resource allocation to a user equipment (UE).

According to certain aspects, an apparatus for allocating uplink resources in a wireless communications network is provided. The apparatus generally includes means for determining an allocation of physical uplink control channel (PUCCH) resources of a subframe for a physical uplink control channel (PUCCH), wherein at least one of a location and a size of a region of PUCCH resources allocated for the subframe is dependent on a subframe type and subframe types comprise at least a first type in which transmissions in a first cell are protected by restricting transmissions in a second cell and means for transmitting, in the subframe, information to a base station of the first cell using the allocated PUCCH resources for that subframe type.

According to certain aspects, an apparatus for allocating uplink resources in a wireless communications network is provided. The apparatus generally includes means for determining an allocation of physical uplink control channel (PUCCH) resources of a subframe for a physical uplink control channel (PUCCH), wherein at least one of a location and a size of a region of PUCCH resources allocated for the subframe is dependent on a subframe type and subframe types comprise at least a first type in which transmissions in a first cell are protected by restricting transmissions in a second cell and means for signaling the resource allocation to a user equipment (UE).

According to certain aspects an apparatus for allocating uplink resources in a wireless communications network is provided. The apparatus generally includes at least one processor configured to determine an allocation of physical uplink control channel (PUCCH) resources of a subframe for a physical uplink control channel (PUCCH), wherein at least one of a location and a size of a region of PUCCH resources allocated for the subframe is dependent on a subframe type and subframe types comprise at least a first type in which transmissions in a first cell are protected by restricting transmissions in a second cell and transmit, in the subframe, information to a base station of the first cell using the allocated PUCCH resources for that subframe type; and a memory coupled to the at least one processor.

According to certain aspects, an apparatus for allocating uplink resources in a wireless communications network is provided. The apparatus generally includes at least one processor configured to determine an allocation of physical uplink control channel (PUCCH) resources of a subframe for a physical uplink control channel (PUCCH), wherein at least one of a location and a size of a region of PUCCH resources allocated for the subframe is dependent on a subframe type and subframe types comprise at least a first type in which transmissions in a first cell are protected by restricting transmissions in a second cell and signal the resource allocation to a user equipment (UE); and a memory coupled to the at least one processor.

According to certain aspects, a computer program product comprising a computer-readable medium having instructions stored thereon for determining allocated uplink resources in a wireless communications network is provided. The instructions are generally executable by one or more processors for determining an allocation of physical uplink control channel (PUCCH) resources of a subframe for a physical uplink control channel (PUCCH), wherein at least one of a location and a size of a region of PUCCH resources allocated for the subframe is dependent on a subframe type and subframe types comprise at least a first type in which transmissions in a first cell are protected by restricting transmissions in a second cell and transmitting, in the subframe, information to a base station of the first cell using the allocated PUCCH resources for that subframe type.

According to certain aspects, a computer program product comprising a computer-readable medium having instructions stored thereon for allocating uplink resources in a wireless communications network is provided. The instructions are generally executable by one or more processors for determining an allocation of physical uplink control channel (PUCCH) resources of a subframe for a physical uplink control channel (PUCCH), wherein at least one of a location and a size of a region of PUCCH resources allocated for the subframe is dependent on a subframe type and subframe types comprise at least a first type in which transmissions in a first cell are protected by restricting transmissions in a second cell and signaling the resource allocation to a user equipment (UE).

Various aspects and features of the disclosure are described in further detail below.

DETAILED DESCRIPTION

Techniques for allocating uplink resources in a wireless communications network are described herein. According to certain aspects, at least one of the location or size of resources allocated for a physical uplink control channel (PUCCH) is dependent on a subframe type, with the subframe types comprising at least a first type in which transmissions in a first cell are protected by restricting transmissions in a second cell. The subframe type dependent resource allocation may take advantage of protection provided the first type of subframe, allowing a larger region to be used for PUCCH transmissions that might benefit from more robust and reliable transmissions, which may result in improved system performance. Subframes with less protection than the first subframe type (or no protection at all) may have a reduced PUCCH region relative to that of the first subframe type.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
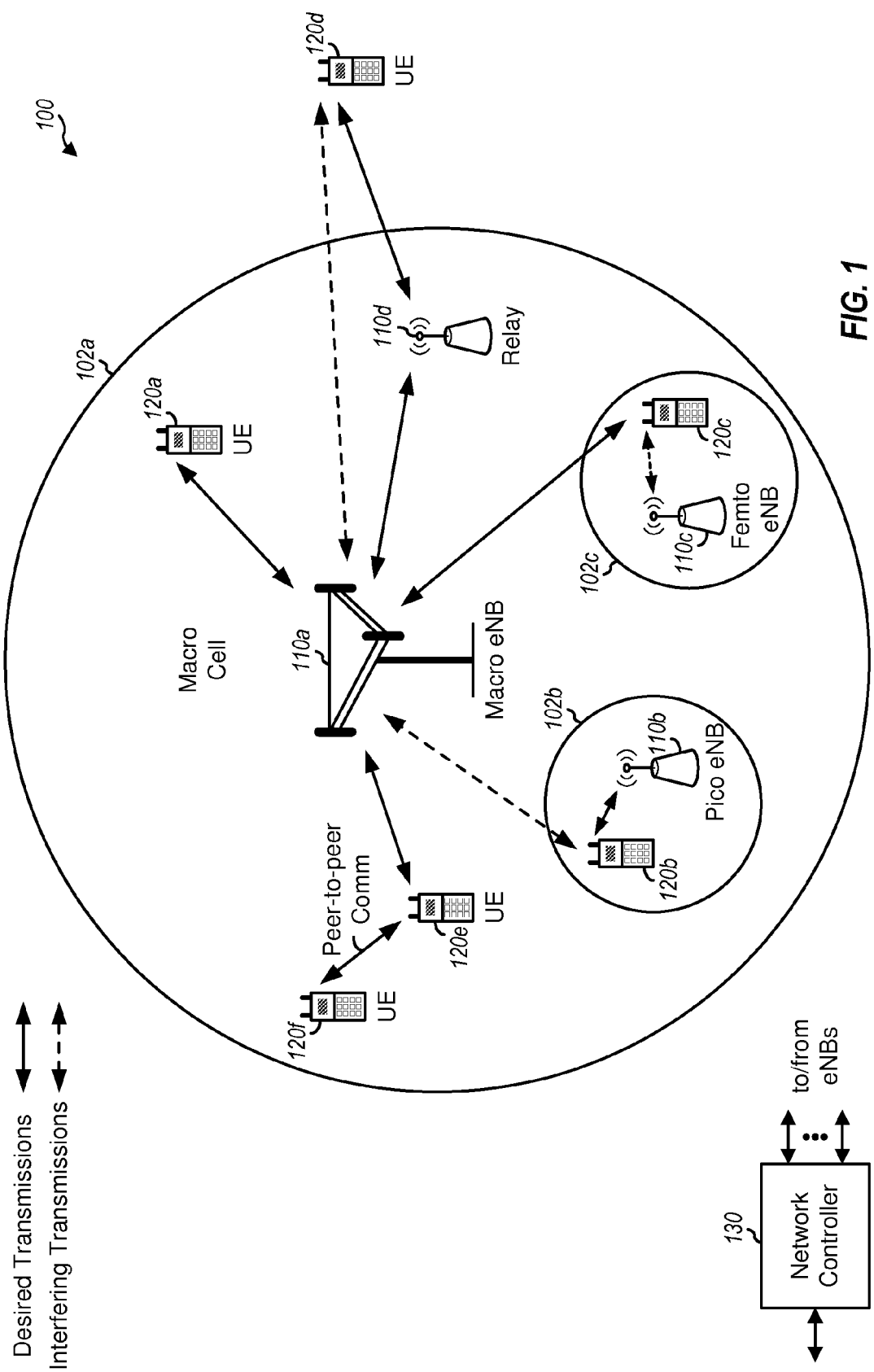
FIG. 1 shows a wireless communication network.

FIG. 1 shows a wireless communication network 100, which may be an LTE network or some other wireless network. The interference management techniques presented herein may be used in such a system.

Wireless network 100 may include a number of evolved Node Bs (eNBs) 110 and other network entities. An eNB may be an entity that communicates with the UEs and may also be referred to as a base station, a Node B, an access point, etc. Each eNB may provide communication coverage for a particular geographic area. In 3GPP, the term "cell" may refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a home eNB (HeNB) or a femto eNB. In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station", and "cell" may be used interchangeably herein.

Wireless network 100 may also include relays. A relay may be an entity that may receive a transmission of data from an upstream station (e.g., an eNB or a UE) and send a transmission of the data to a downstream station (e.g., a UE or an eNB). A relay may also be a UE that may relay transmissions for other UEs. In the example shown in FIG. 1, a relay 110d may communicate with macro eNB 110a via a backhaul link and with a UE 120d via an access link in order to facilitate communication between eNB 110a and UE 120d. A relay may also be referred to as a relay eNB, a relay station, a relay base station, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage sizes, and different impact on interference in wireless network 100. For example, macro eNBs may have a high transmit power level (e.g., 5 to 40 Watts) whereas pico eNBs, femto eNBs, and relays may have lower transmit power levels (e.g., 0.1 to 2 Watts).

A network controller 130 may couple to a set of eNBs and may provide coordination and control for these eNBs. Network controller 130 may comprise a single network entity or a collection of network entities. Network controller 130 may communicate with the eNBs via a backhaul. The eNBs may also communicate with one another, e.g., directly or indirectly via a wireless or wireline backhaul.

UEs 120 (e.g., UE 120a, UE 120b, etc.) may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A UE may be able to communicate with macro eNBs, pico eNBs, femto eNBs, relays, etc. A UE may also be able to communicate peer-to-peer (P2P) with another UE. In the example shown in FIG. 1, UEs 120e and 120f may communicate directly with each other without communicating with an eNB in wireless network 100. P2P communication may reduce the load on wireless network 100 for local communications between UEs. P2P communication between UEs may also allow one UE to act as a relay for another UE, thereby enabling the other UE to connect to an eNB.

In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal to interference plus noise ratio (SINR), or a reference signal received quality (RSRQ), or some other metric.

A UE may operate in a dominant interference scenario in which the UE may observe high interference from one or more interfering eNBs. A dominant interference scenario may occur due to restricted association. For example, in FIG. 1, UE 120c may be close to femto eNB 110c and may have high received power for eNB 110c. However, UE 120c may not be able to access femto eNB 110c due to restricted association and may then connect to macro eNB 110a with lower received power. UE 120c may then observe high interference from femto eNB 110c on the downlink and may also cause high interference to femto eNB 110c on the uplink.

A dominant interference scenario may also occur due to range extension, which is a scenario in which a UE connects to an eNB with lower pathloss and possibly lower SINR among all eNBs detected by the UE. For example, in FIG. 1, UE 120b may be located closer to pico eNB 110b than macro eNB 110a and may have lower pathloss for pico eNB 110b. However, UE 120b may have lower received power for pico eNB 110b than macro eNB 110a due to a lower transmit power level of pico eNB 110b as compared to macro eNB 110a. Nevertheless, it may be desirable for UE 120b to connect to pico eNB 110b due to the lower pathloss. This may result in less interference to the wireless network for a given data rate for UE 120b.

Various interference management techniques may be used to support communication in a dominant interference scenario. These interference management techniques may include semi-static resource partitioning (which may be referred to as inter-cell interference coordination (ICIC)), dynamic resource allocation, interference cancellation, etc. Semi-static resource partitioning may be performed (e.g., via backhaul negotiation) to allocate resources to different cells. The resources may comprise subframes, subbands, carriers, resource blocks, transmit power, etc. Each cell may be allocated a set of resources that may observe little or no interference from other cells or their UEs. Dynamic resource allocation may also be performed (e.g., via exchange of over-the-air messages between cells and UEs) to allocate resources as needed to support communication for UEs observing strong interference on the downlink and/or uplink. Interference cancellation may also be performed by UEs to mitigate interference from interfering cells.

Wireless network 100 may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single HARQ interlace, which may include every Q-th subframes, where Q may be equal to 4, 6, 8, 10, or some other value. For asynchronous HARQ, each transmission of the packet may be sent in any subframe.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 100 may utilize FDD or TDD. For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods.

Figure 2:
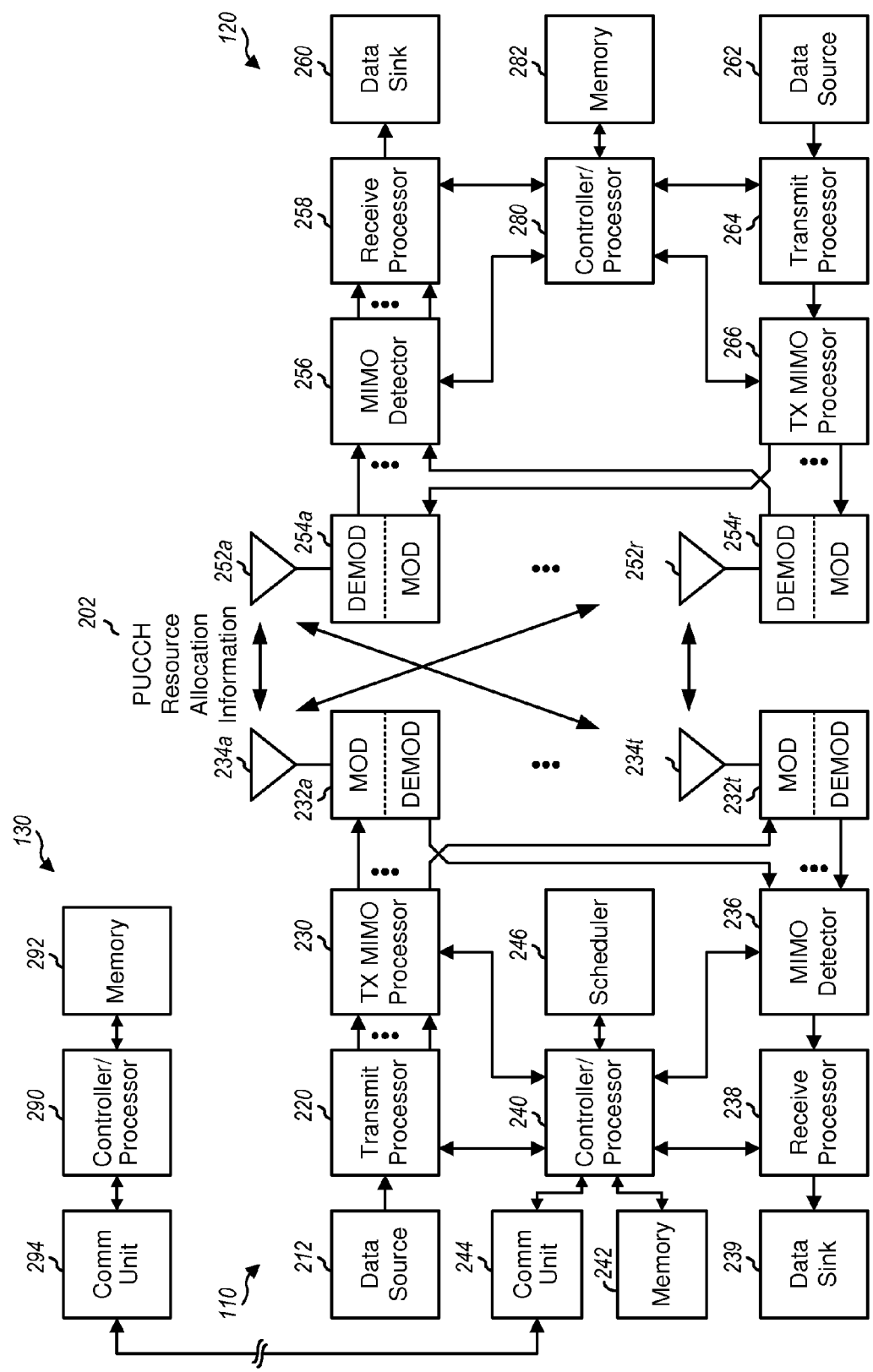
FIG. 2 shows a block diagram of a base station and a UE.

FIG. 2 shows a block diagram of a design of a base station/eNB 110 and a UE 120, which may be one of the base stations/eNBs and one of the UEs in FIG. 1. The various components (e.g., processors) shown in FIG. 2 may be utilized to perform the interference management techniques described herein. As illustrated, the base station 110 may transmit PUCCH resource allocation information 202 to the UE 120. As will be described in greater detail below, the PUCCH resource allocation information 202 may indicate subframe type dependent PUCCH regions in which the UE 120 may transmit information to a base station (BS).

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs and control information from a controller/processor 240. Processor 220 may process (e.g., encode and modulate) the data and control information to obtain data symbols and control symbols, respectively. Transmit processor 220 may also generate reference symbols for synchronization signals, reference signals, etc. A transmit (TX) multiple-input multiple-output (MIMO) processor 230 may perform spatial processing (e.g., precoding) on the data symbols, the control symbols, and/or the reference symbols, if applicable, and may provide T output symbol streams to T modulators (MODS) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110, downlink signals from other base stations, and/or P2P signals from other UEs and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information to a controller/processor 280.

On the uplink, at UE 120, a transmit processor 264 may receive data from a data source 262 and control information from controller/processor 280. Processor 264 may process (e.g., encode and modulate) the data and control information to obtain data symbols and control symbols, respectively. Processor 264 may also generate reference symbols for one or more reference signals, etc. The symbols from transmit processor 264 may be precoded by a TX MIMO processor 266 if applicable, further processed by modulators 254a through 254r (e.g., for SC-FDM, OFDM, etc.), and transmitted to base station 110, other base stations, and/or other UEs. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120 and other UEs. Receive processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct processing for the techniques described herein. Processor 280 and/or other processors and modules at UE 120 may perform or direct processing for the techniques described herein. Memories 242 and 282 may store data and program codes for base station 110 and UE 120, respectively. A communication (Comm) unit 244 may enable base station 110 to communicate with other network entities (e.g., network controller 130). A scheduler 246 may schedule UEs for data transmission on the downlink and/or uplink.

According to certain aspects, the controller/processor 240 may determine the PUCCH resource allocation information 202 and provide this information to the transmit processor 220 for transmitting to the UE 120 for use in determining resources to use for PUCCH transmissions (such as CQI, HARQ ACKs, etc.). In turn, the receive processor 258 and/or controller/processor 280 of the UE 120 may extract the PUCCH resource allocation information 202 and provide it to the transmit processor 264 for use in transmitting PUCCH information, with the size and/or location of PUCCH regions being dependent on a subframe type.

FIG. 2 also shows a design of network controller 130 in FIG. 1. Within network controller 130, a controller/processor 290 may perform various functions to support communication for UEs. Controller/processor 290 may perform processing for the techniques described herein. A memory 292 may store program codes and data for network controller 130. A communication unit 294 may enable network controller 130 to communicate with other network entities.

As noted above, the BS 110 and UE 120 may utilize FDD or TDD. For FDD, the downlink and uplink may be allocated separate frequency channels, and downlink transmissions and uplink transmissions may be sent concurrently on the two frequency channels.

Figure 3:
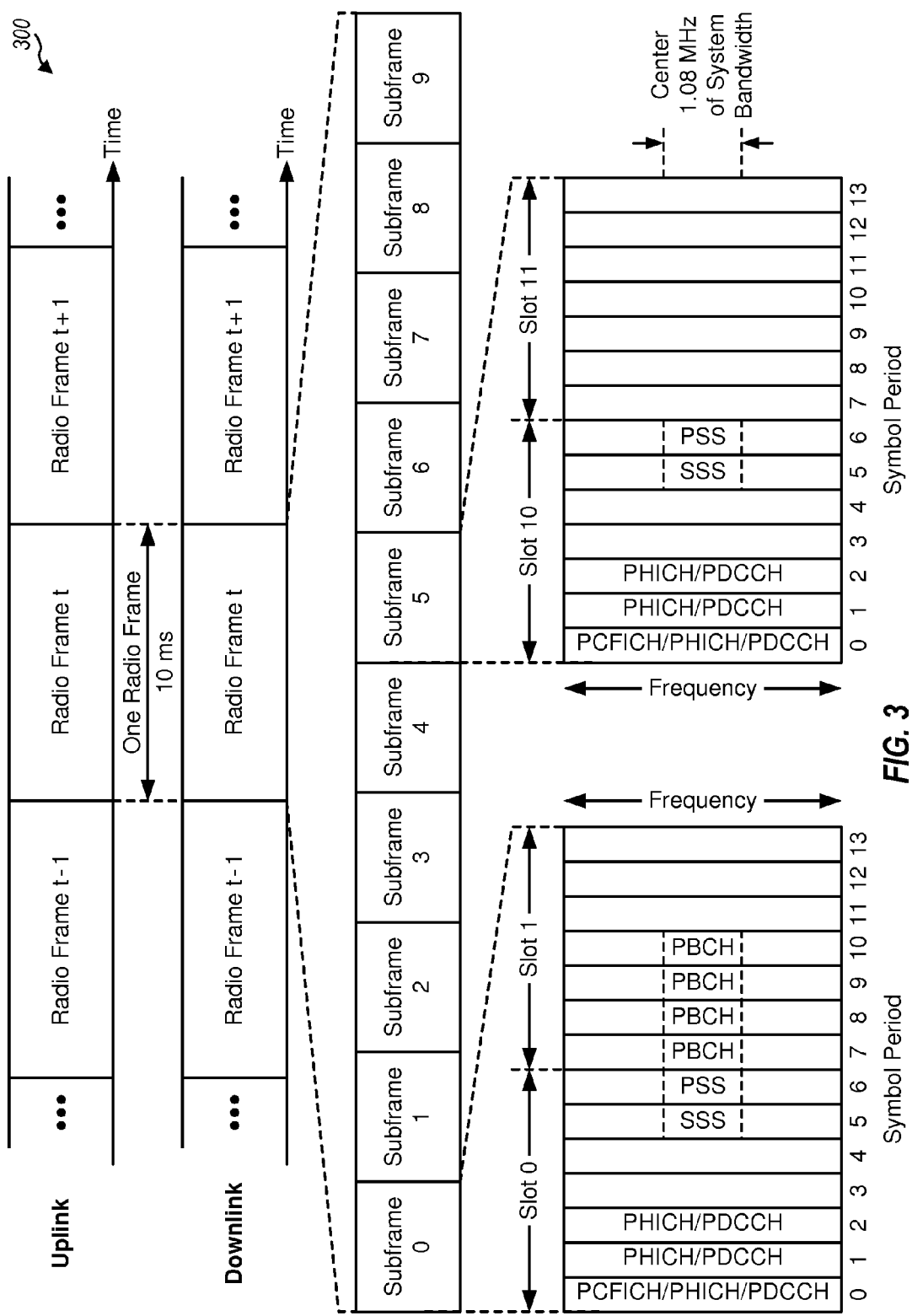
FIG. 3 shows a frame structure for frequency division duplex (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 356, 512, 1024 or 2048 for system bandwidth of 1.25, 2.5, 5, 10 or 20 megahertz (MHz), respectively. The system bandwidth may also be partitioned into a number of subbands, and each subband may cover a range of frequencies, e.g., 1.08 MHz.

The available time frequency resources for each of the downlink and uplink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

In LTE, an eNB may transmit a Physical Control Format Indicator Channel (PCFICH), a Physical HARQ Indicator Channel (PHICH), and a Physical Downlink Control Channel (PDCCH) in a control region of a subframe. The PCFICH may convey the size of the control region. The PHICH may carry acknowledgement (ACK) and negative acknowledgement (NACK) feedback for data transmission sent on the uplink with HARQ. The PDCCH may carry grants and/or other control information. The eNB may also transmit a Physical Downlink Shared Channel (PDSCH) in a data region of a subframe (not shown in FIG. 3). The PDSCH may carry data for UEs scheduled for data transmission on the downlink.

In LTE, an eNB may also transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by the UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as system information blocks (SIBS) on the PDSCH in certain subframes.

Figure 4:
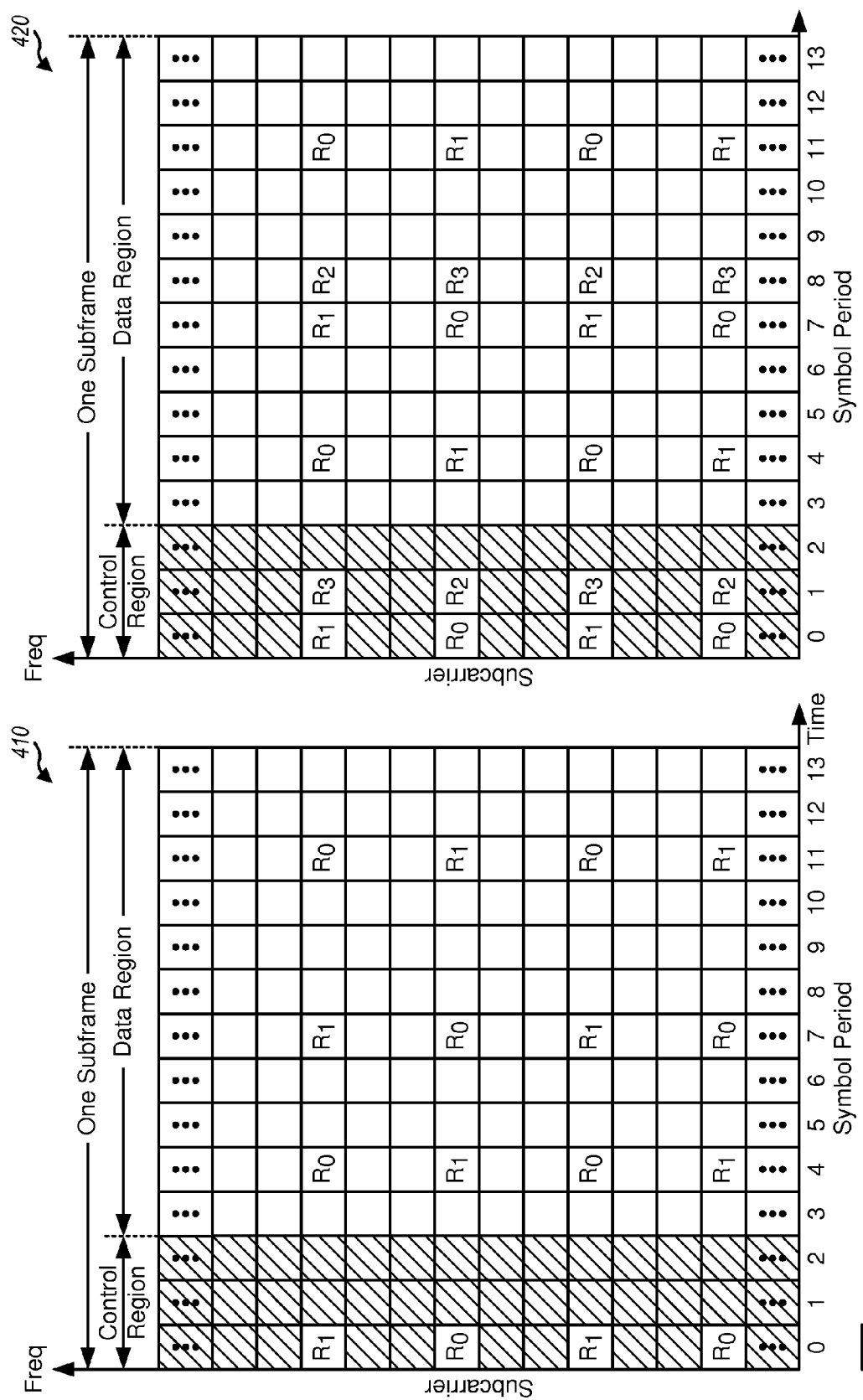
FIG. 4 shows two exemplary subframe formats for the downlink.

FIG. 4 shows two exemplary subframe formats 410 and 420 for the downlink with the normal cyclic prefix in LTE. A subframe for the downlink may include a control region followed by a data region, which may be time division multiplexed. The control region may include the first M symbol periods of the subframe, where M may be equal to 1, 2, 3 or 4. M may change from subframe to subframe and may be conveyed by the PCFICH in the first symbol period of the subframe. The control region may carry control information. The data region may include the remaining 2L−M symbol periods of the subframe and may carry data and/or other information.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on the cell ID. Different eNBs may transmit CRSs for their cells on the same or different subcarriers, depending on the cell IDs of these cells. For both subframe formats 410 and 420, resource elements not used for the CRS may be used to transmit data or control information.

Figure 5:
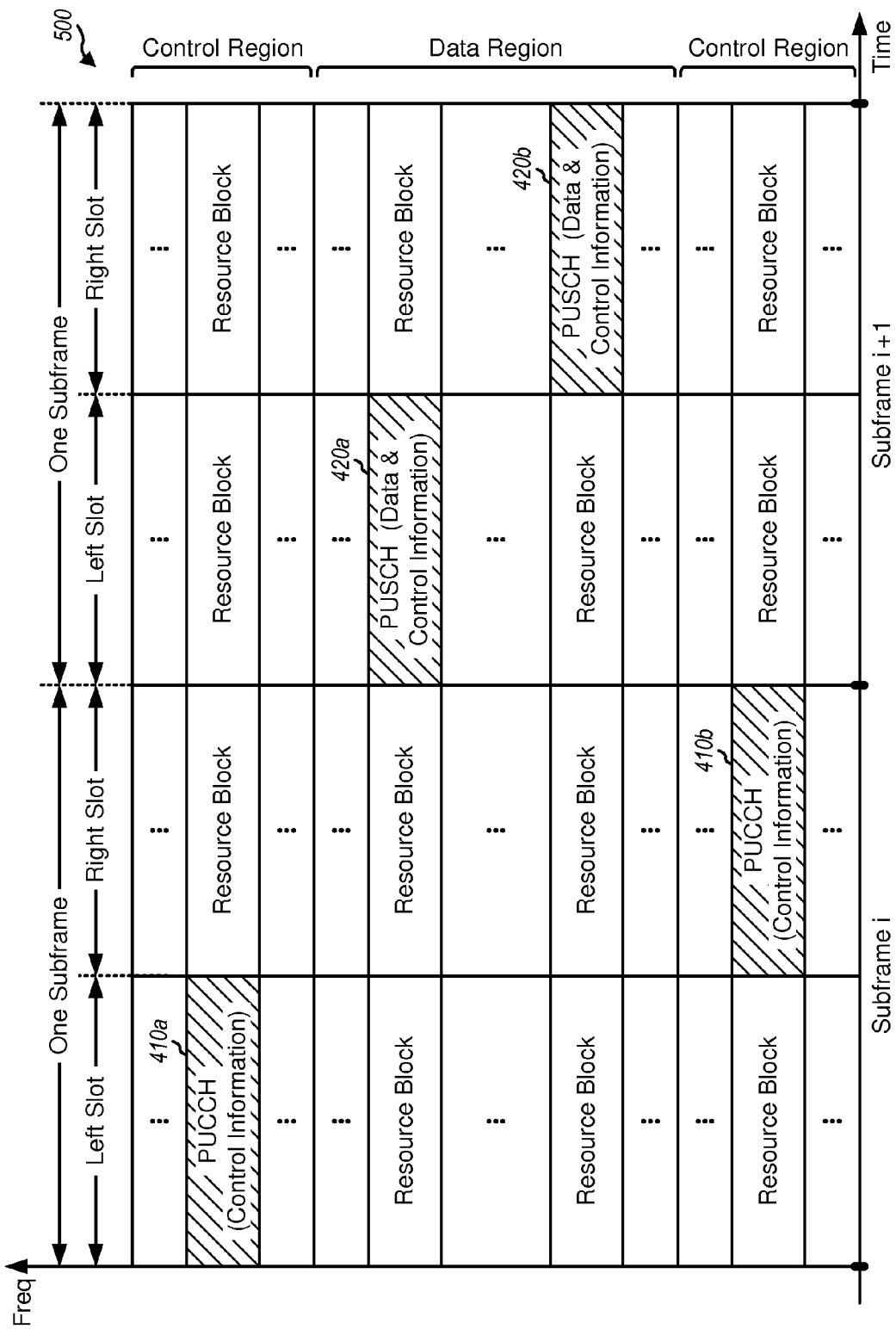
FIG. 5 shows an exemplary subframe format for the uplink.

FIG. 5 shows an exemplary subframe format 500 for the uplink in LTE. A subframe for the uplink may include a control region and a data region, which may be frequency division multiplexed. The control region may be formed at the two edges of the system bandwidth and may have a configurable size. The data region may include all resource blocks not included in the control region.

A UE may be assigned resource blocks in the control region to send control information to an eNB. The UE may also be assigned resource blocks in the data region to send data to the eNB. The UE may send control information on a Physical Uplink Control Channel (PUCCH) on assigned resource blocks 510a and 510b in the control region. The UE may send only data, or both data and control information, on a Physical Uplink Shared Channel (PUSCH) on assigned resource blocks 520a and 520b in the data region. An uplink transmission may span both slots of a subframe and may hop across frequency, as shown in FIG. 5.

As will be described in greater detail below, the location and/or size of the PUCCH region may vary depending on a subframe type. As a consequence, in some cases, other regions (such as a dynamic ACK/NACK region and/or PUSCH region may also vary depending on a subframe type.

Figure 6:
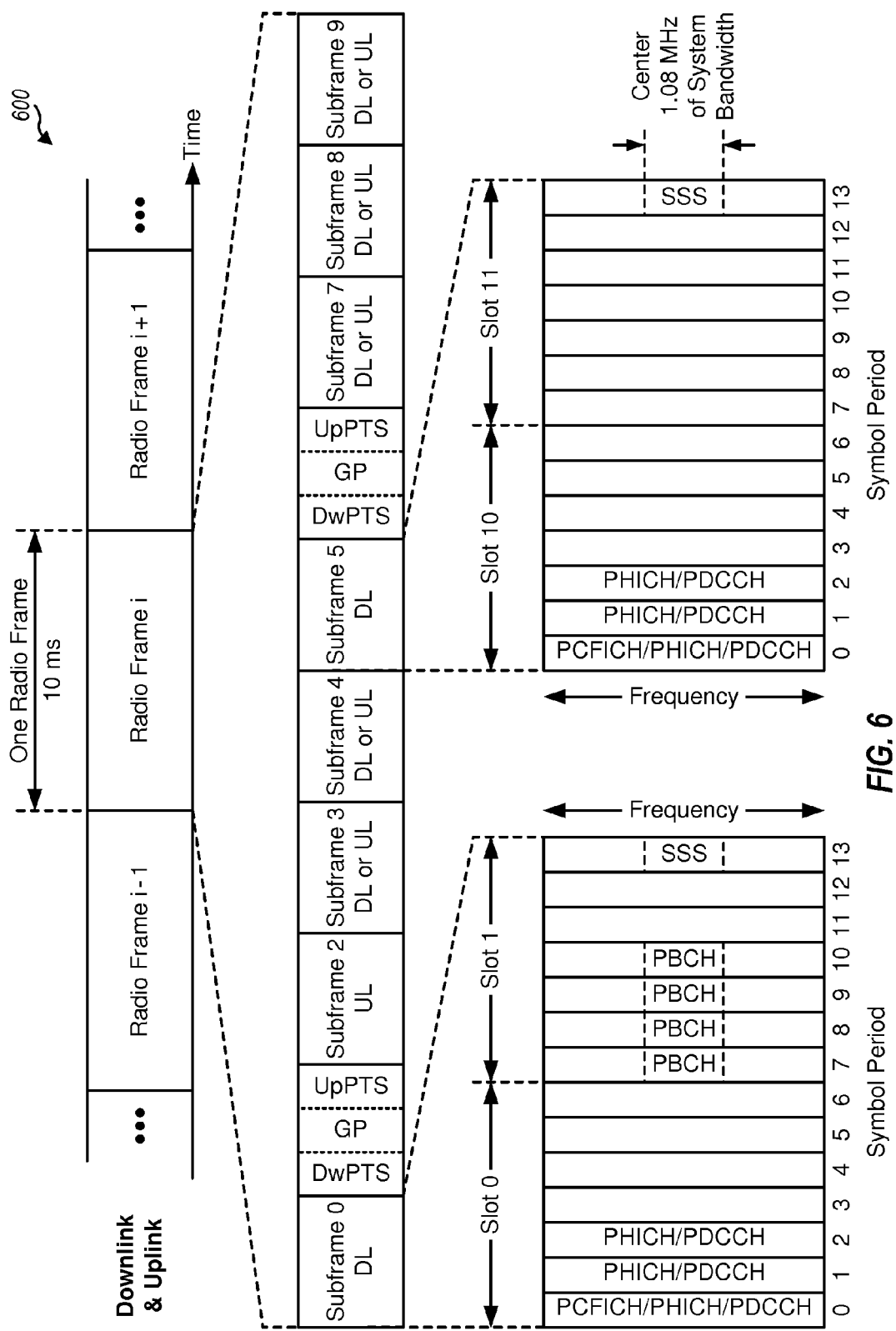
FIG. 6 shows a frame structure for time division duplex (TDD).

FIG. 6 shows an exemplary frame structure 600 for TDD in LTE. LTE supports a number of downlink-uplink configurations for TDD. Subframes 0 and 5 are used for the downlink (DL) and subframe 2 is used for the uplink (UL) for all downlink-uplink configurations. Subframes 3, 4, 7, 8 and 9 may each be used for the downlink or uplink depending on the downlink-uplink configuration. Subframe 1 includes three special fields composed of (i) a Downlink Pilot Time Slot (DwPTS) used for downlink control channels as well as data transmissions, (ii) a Guard Period (GP) of no transmission, and (iii) an Uplink Pilot Time Slot (UpPTS) used for either a Random Access Channel (RACH) or sounding reference signals (SRS). Subframe 6 may include only the DwPTS, or all three special fields, or a downlink subframe depending on the downlink-uplink configuration. The DwPTS, GP and UpPTS may have different durations for different subframe configurations.

On the downlink, an eNB may transmit the PSS in symbol period 2 of subframes 1 and 6 (not shown in FIG. 6), and the SSS in the last symbol period of subframes 0 and 5. The eNB may transmit the CRS in certain symbol periods of each downlink subframe. The eNB may also transmit the PBCH in subframe 0 of certain radio frames.

The various frame structures, subframe formats, physical channels, and signals in LTE are described in 3GPP TS 36.211, entitled "Evolved Universal Terrestrial Radio Access (E-UTRA); Physical Channels and Modulation," which is publicly available.

Those skilled in the art will recognize that the interference management techniques presented herein may be implemented using any suitable combination of hardware and/or software components. According to certain aspects, various operations of such techniques may be implemented using one or more "software configurable" programmable processors.

Certain aspects of the present disclosure provide techniques for flexible uplink resource allocation in a subframe dependent manner. As will be described in greater detail, the size and/or location of a PUCCH region for each subframe may depend on the subframe type. Subframe of a type in which transmissions are protected (with limited or no transmission in a potentially interfering cell) may have a larger PUCCH region than subframes with less or no protection.

This may be advantageous, as it may be preferable to have robust PUCCH transmissions via protected (e.g., U) subframes initially, before scheduling UL transmissions for shared (e.g., X) subframes. Thus, as will be described below, new (additional) PUCCH regions may be relatively small in non-protected (e.g., X subframes). Various implementation examples of subframe dependent PUCCH regions are described below.

Figure 7:
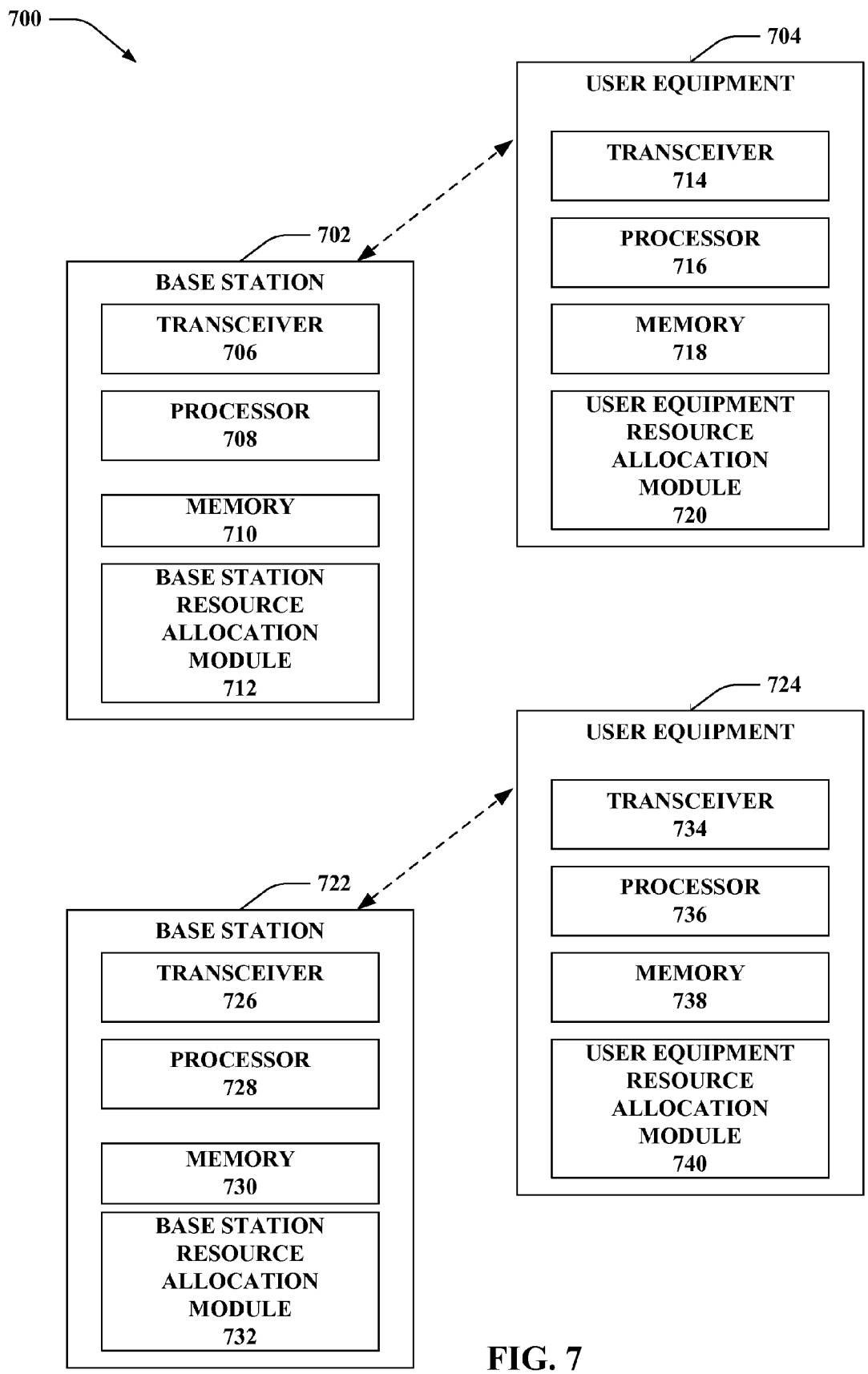
FIG. 7 shows example functional components of a base station and a UE, in accordance with certain aspects of the present disclosure.

FIG. 7 illustrates an example communication system 700 that may take advantage of subframe dependent PUCCH resource allocation, in accordance with certain aspects of the present disclosure.

As illustrated, the wireless communication system 700 which may include BSs 702, 722 and UEs 704, 724 served by BS 702, 722, respectively. BSs 702, 722 may be located in different cells that potentially interfere with each other. According to certain aspects, the communication system 700 may be a heterogeneous network and the BSs 702, 722 may be a combination of, e.g., a macro BS, a Femto BS, a pico BS, and the like. According to certain aspects, the wireless communication system 700 may be an LTE or an LTE-A system.

BSs 702, 722 may include transceivers 706, 726 configured to transmit and receive data and/or control information and/or any other type of information described herein with reference to any of the systems, methods, apparatus and/or computer program products to and from UEs 704, 724, respectively. For example, transceivers 706, 726 may be configured to transmit and/or receive time and/or frequency resource partitioning information, data, and control channels.

BSs 702, 722 may also include various processors 708, 728 and memory 710, 730. Processors 708, 728 may be configured to perform one or more of the interference management functions described herein. The BSs 702, 722 may include memory 710, 730, for example, each storing instructions executable by the processors 708, 728, to perform various operations described herein.

BSs 702, 722 may also include BS resource allocation modules 712, 732 configured to allocate resources, for example, to achieve interference management. The resources allocated may include, but are not limited to, time and/or frequency transmission resources. For example, the resource allocation modules 712, 732 may be configured to transmit, generate and/or process resource partitioning information between different power classes of BSs. According to certain aspects, the resource allocation modules 712, 732 may be configured to allocate PUCCH resources in a subframe dependent manner, for example, based on subframe types identified in the resource partitioning information.

The wireless communication system 700 may also include UEs 704, 724 served by BSs 702, 722, respectively, and located in corresponding cells managed by BSs 702, 722.

UEs 704, 724 may include transceivers 714, 734 configured to transmit and receive data and/or control information and/or any other type of information described herein to and from BSs 702, 722, respectively. For example, transceivers 714, 734 may be configured to transmit and/or receive time and/or frequency resource partitioning information. According to certain aspects, transceivers 714, 734 may be configured to transmit in different types of subframes including, but not limited to, usable, non-usable and flexibly usable subframes. Transceivers 714, 734 may be configured to receive data and control channels.

UEs 704, 724 may also include processors 716, 736 and memory 718, 738. Processors 716, 736 may be configured to perform one or more of the functions described herein with reference to any of the systems, methods, apparatus and/or computer program products. The UEs 704, 724 may include memory 718, 738 for example, each storing instructions executable by the processors 716, 736, to perform various operations described herein.

UEs 704, 724 may also include UE resource allocation modules 720, 740 configured to receive and process resource allocation information for interference management. For example, the UE resource allocation modules 720, 740 may be configured to receive and process resource partitioning information between different power classes of BSs. According to certain aspects, the resource allocation modules 720, 740 may also be configured to receive PUCCH resource allocation information and determine what resources should be used, based on a subframe type, for transmitting PUCCH information.

The above-referenced resource allocation modules may be configured to perform resource partitioning to protect control and/or data transmissions from DL and/or UL interference. As noted above, the resource allocation may be in the time and/or frequency domains. For example, for time-domain resource partitioning for the UL, three types of subframes may be defined. The U, N and X subframes may be defined. U subframes may be usable for a given cell, and typically free of interference from cells of different classes. N subframes refer to non-usable subframes that are typically not usable by a given cell in order to avoid excessive interference to cells of different classes. X subframes may be usable in some cases, based on the BS implementation for the cell. The U subframes of each cell may correspond to the subframes in the interlace(s) allocated to that cell. The U subframes and N subframes of cells of different types may be configured in a complementary manner, so that a U subframe of a cell of a particular type corresponds to N subframes of cells of other types. This complementary definition of subframes may enable reliable transmission of data and control information, especially when cells of different types are neighbors and interfere with each other.

Resource partitioning may be performed in a semi-static or static manner, e.g., via negotiation between cells through the backhaul. Each cell may know the results of the resource partitioning and may be aware of the different types of subframes applicable to that cell. Each cell may use its U subframes, which may correspond to subframes in its allocated interlace(s). Each cell may avoid causing excessive interference in its N subframes, which may correspond to subframes in interlaces allocated to cells of other types. For example, a cell may transmit at a low power level to UEs located close to the cell in its U subframes and may then avoid causing strong interference to UEs in neighbor cells. A cell may also avoid transmitting in its U subframes to avoid causing any interference to the UEs in the neighbor cells. A cell may or may not use its X subframes depending on a decision made by/for the cell based on various factors such as load information of involved cells, UE channel information, traffic information, availability of information among different cells, etc. A cell may choose to allocate such X subframes to leave itself some freedom in scheduling as well. A cell may use its U subframes the most, its X subframes as needed, and its N subframes the least.

UEs 704, 724 may typically transmit in U subframes for best interference protection (as transmissions in these subframes in neighboring cells are restricted), while avoiding transmitting in N subframes (at least on best-effort basis) in order to avoid excessive interference. UEs 704, 724 may optionally use the X subframes, e.g., as dictated by decisions by the BSs 702, 722 for the given cell. Applying this approach to subframe usage, U subframes may generally be expected to be used by the UEs 704, 724 most often, X subframes may (or may not) be optionally used and N subframes are expected to be used least (to avoid excessive interference when possible).

When a UE served by a macro BS is geographically close to a cell managed by a Femto BS, the UE may receive instructions to not transmit in macro N subframes (as such is likely to cause high interference to the Femto cell). The UE may or may not be aware of the above subframe types. The Femto cell, which is not accessible to the UE, thus would not see strong interference from the UE served by the macro BS. Accordingly, UEs served by the Femto BS may then transmit in U subframes for UL transmissions.

When a UE served by a macro BS is unaware of the above subframe types, the macro BS may still perform UL scheduling such that the UE served by the macro BS is not scheduled in N subframes, for example, at least on a best-effort basis.

Applying the above scenarios, the complementary nature of the U and N subframes in neighboring cells (e.g., a subframe considered a U subframe in one cell is typically considered an N subframe in an interfering cell) coupled with appropriate scheduling by the BS in a cell, may enable a UE served by a Femto BS to avoid experiencing strong UL interference from UEs served by a macro BS and that are geographically near the Femto cell. The UEs served by the Femto BS may therefore avoid this interference while transmitting U subframes.

However, other methods for reducing interference when other types of subframes (other than the U subframe) are transmitted may also be desirable. According to certain aspects, a BS may avoid scheduling the UE during the non-U subframe. Such limitation, however, may impact the UL performance of the Femto cell, because the number of U subframes in the Femto cell may be limited.

According to certain aspects presented herein, subframe type-dependent PUCCH regions may be utilized in an effort to take advantage of protected subframes. For example, larger PUCCH regions may be possible in more protected subframes. In other words, the protection of "U" subframes may allow more robust and reliable transmissions, which may be suitable for PUCCH transmissions, while smaller PUCCH regions may be used on other subframe types (e.g., "N" and "X" subframes) due to increased possibility of interference.

This approach may be employed, for example, in the UL of a Femto cell to enable potential UL transmissions over all subframes and to handle the interference variations over different subframes.

The above distinctions of different subframe types may make it beneficial to allocate resources of a PUCCH region dependent on subframe type. As used herein, the term PUCCH region generally refers to a set of uplink resources (which may be contiguous or non-contiguous) that may be used to transmit various types of information, such as Channel Quality Indicators (CQIs), Scheduling Requests (SRs), and Semi-Persistent Scheduling (SPS) Acknowledgment/Negative Acknowledgments (ACK/NAKs). The PUCCH region typically does not include dynamic ACK/NAK (dynamic A/N), which, for purposes of the present disclosure may be considered as separate from the PUCCH region.

Figure 8:
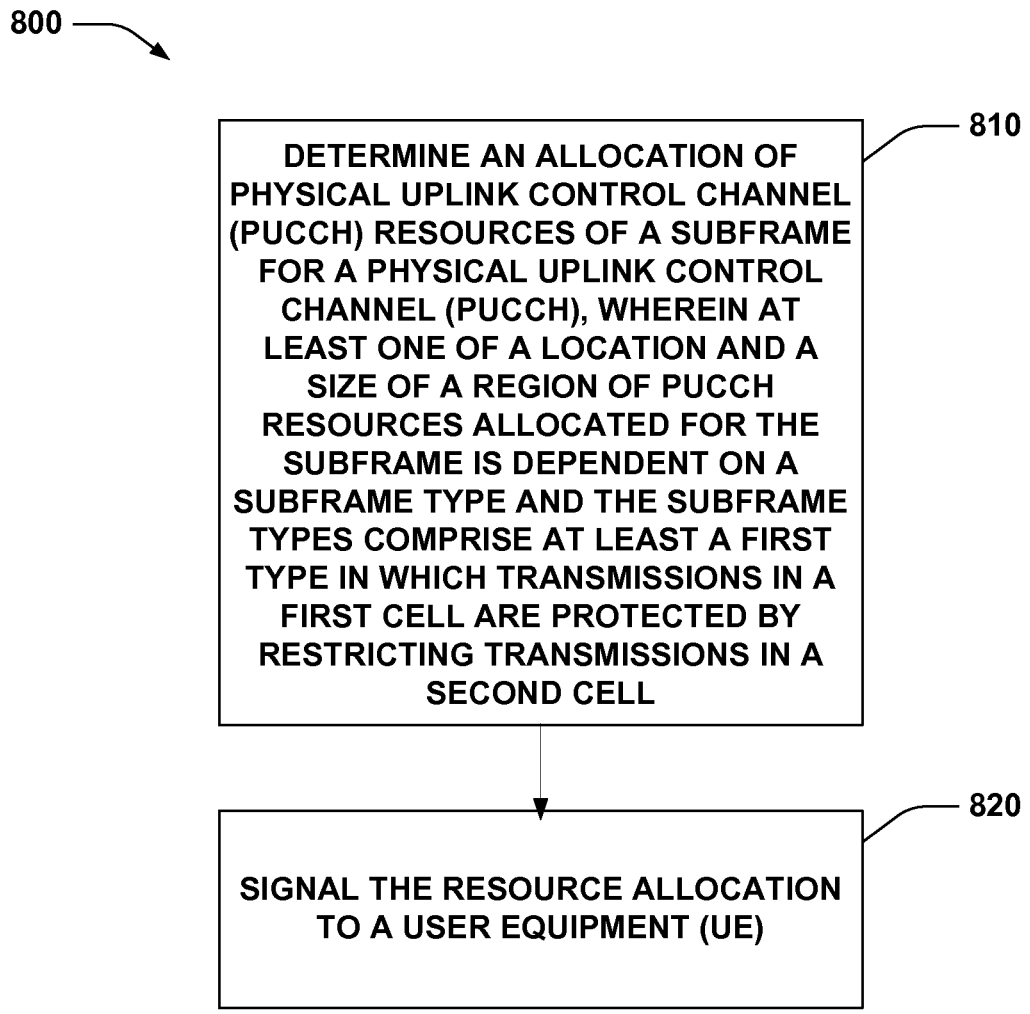
FIG. 8 illustrates example operations that may be performed by a UE, in accordance with certain aspects of the present disclosure.

FIG. 8 illustrates example operations 800 that may be performed, for example, by a base station (e.g., an eNB) to perform subframe dependent PUCCH resource allocation. The operations 800 begin, at 810, by determining an allocation of physical uplink control channel (PUCCH) resources of a subframe for a physical uplink control channel (PUCCH), wherein at least one of a location and a size of a region of PUCCH resources allocated for the subframe is dependent on a subframe type and the subframe types comprise at least a first type in which transmissions in a first cell are protected by restricting transmissions in a second cell. At 820, the BS signals the resource allocation to a user equipment (UE).

Figure 9:
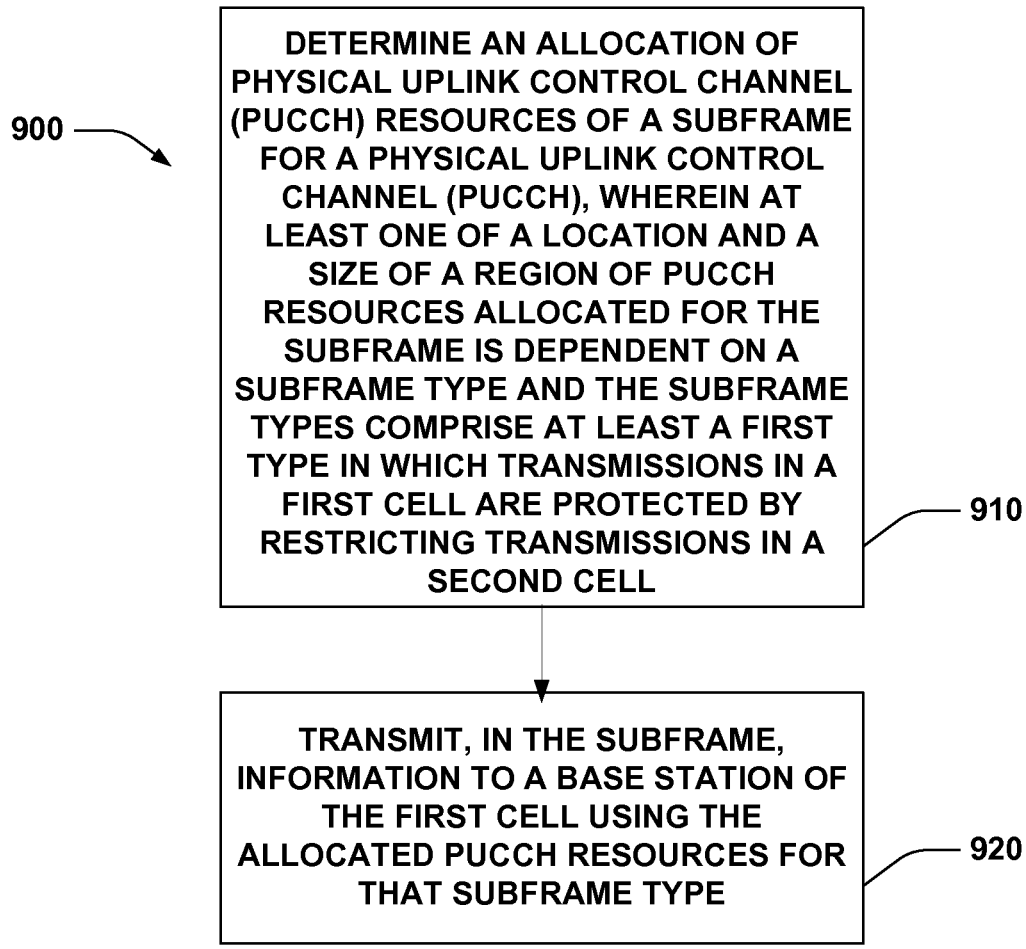
FIG. 9 illustrates example operations that may be performed by a BS, in accordance with certain aspects of the present disclosure.

FIG. 9 illustrates example operations 900 that may be performed, for example, by a UE to determine allocated uplink resources in a wireless communications network. The operations 900 begin, at 910, by determining an allocation of physical uplink control channel (PUCCH) resources of a subframe for a physical uplink control channel (PUCCH), wherein at least one of a location and a size of a region of PUCCH resources allocated for the subframe is dependent on a subframe type and the subframe types comprise at least a first type in which transmissions in a first cell are protected by restricting transmissions in a second cell. At 920, the UE transmits, in the subframe, information to a base station of the first cell using the allocated PUCCH resources for that subframe type.

A base station may allocate resources as part of an overall scheduling function that attempts to schedule a UE based upon the partitioning of subframes into different types. Following this example, the base station may schedule a UE to transmit via the uplink on a U subframe or, optionally, an X subframe, while avoiding or limiting use of an N subframe for uplink transmissions.

According to certain aspects, use of subframe dependent PUCCH regions may result in PUCCH regions that are different from prior or existing ("legacy") PUCCH region designs (e.g., such as LTE Rel-8 PUCCH design), where resources allocated for the PUCCH region is always the same over all subframes, once the PUCCH region is configured by higher layers on a semi-static basis.

According to certain aspects, a base station may signal the resources allocated for subframe dependent PUCCH regions. For example, a base station may send one or more parameters to a UE for determining the subframe dependent PUCCH regions. The one or more parameters, for example, may indicate resources allocated for various regions, such as PUCCH, dynamic A/N, and Physical Uplink Shared Channel (PUSCH). According to certain aspects, the exact parameters provided to the UE may depend on a particular subframe dependent PUCCH region implementation.

Figure 10:
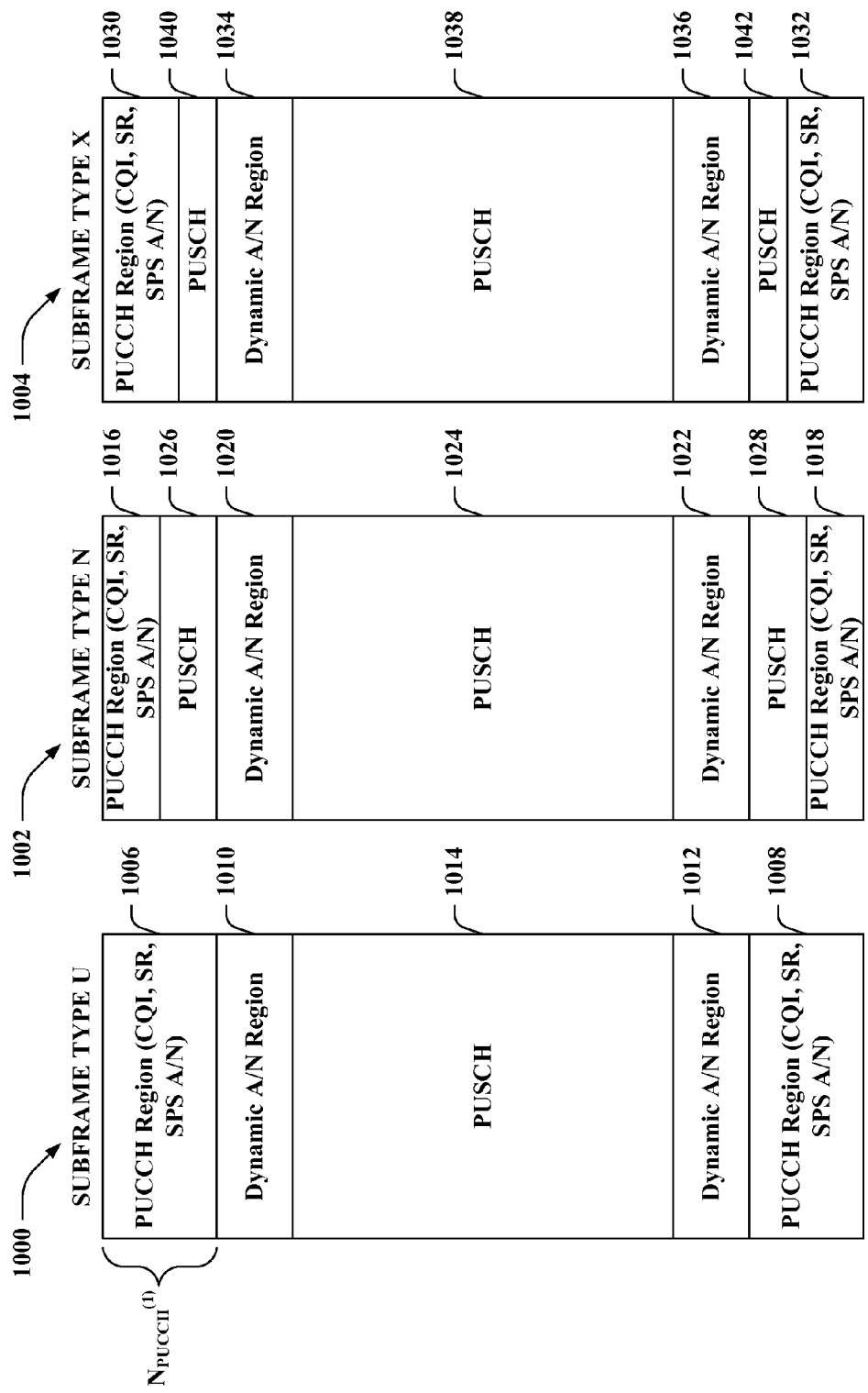
FIGS. 10-12 illustrate different designs of subframe type dependent PUCCH regions, in accordance with certain aspects of the present disclosure.
Figure 11:
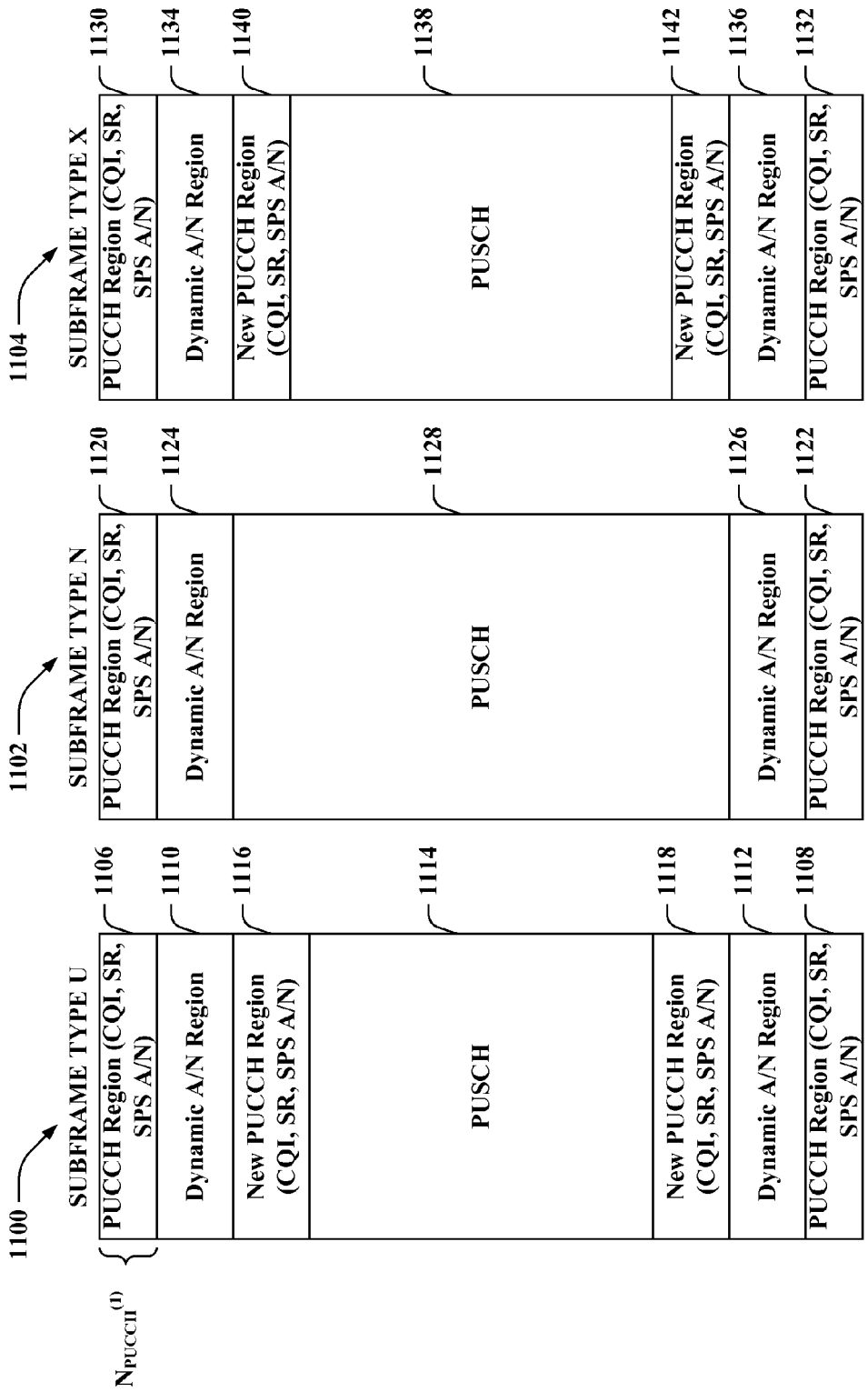
Figure 12:
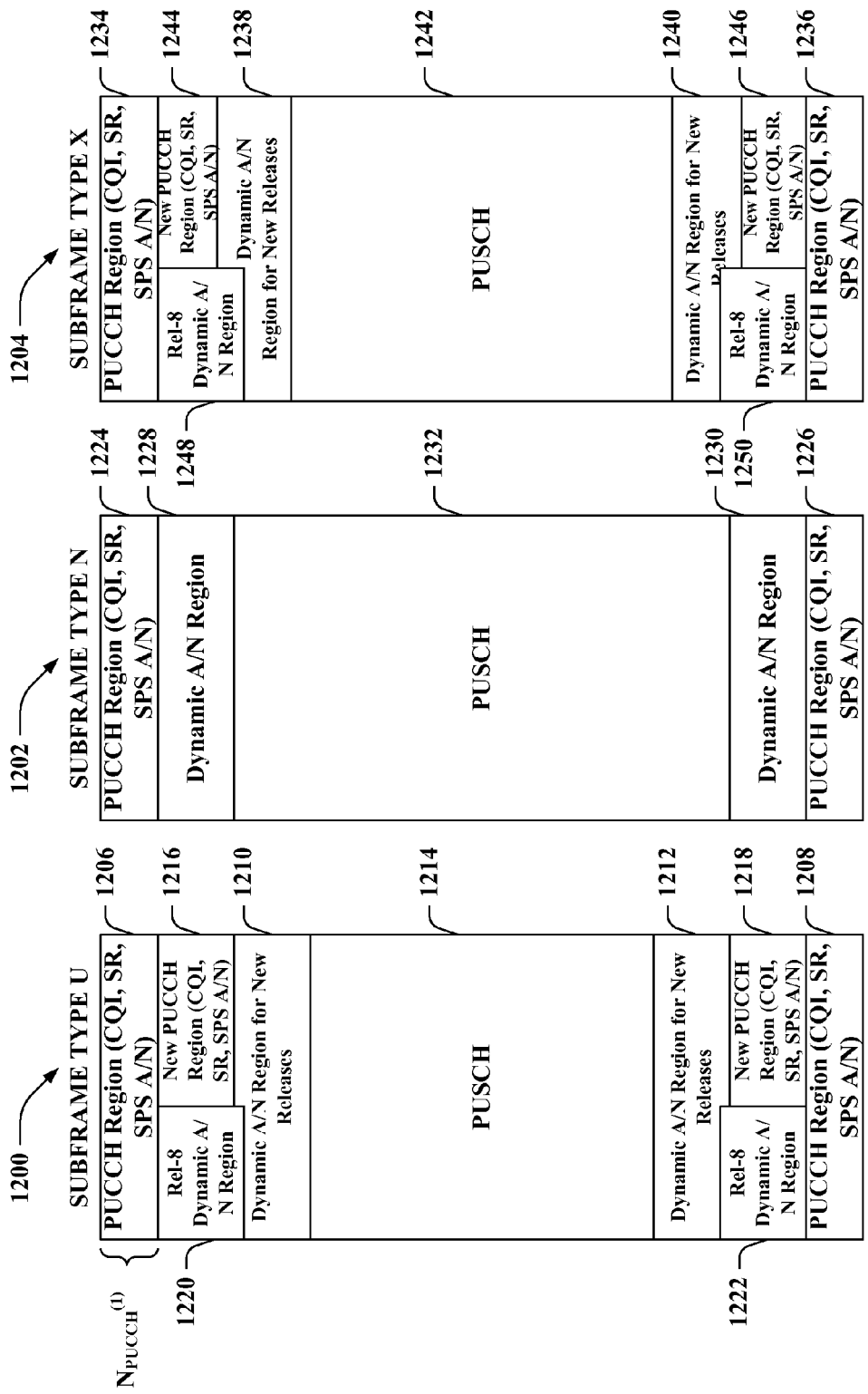

FIGS. 10-12 illustrate example implementation options for subframe dependent PUCCH regions. It is to be appreciated that one or more of the design options can be implemented. Moreover, it is contemplated that other design options for subframe dependent PUCCH regions are intended to fall within the scope of the hereto appended claims. As used herein, terms such as new and additional are relative terms, for example, referring to structures or regions that are not defined by current or earlier versions of standards, such as LTE Rel-8.

FIG. 10 illustrates a first example implementation for subframe dependent PUCCH regions. Depicted subframes include a subframe type U 1000, a subframe type N 1002, and a subframe type X 1004.

As illustrated, subframe type U 1000 may include a PUCCH region 1006, a PUCCH region 1008, a dynamic A/N region 1010, a dynamic A/N region 1012, and a PUSCH region 1014. Subframe type N 1002 may include a PUCCH region 1016, a PUCCH region 1018, a dynamic A/N region 1020, a dynamic A/N region 1022, a PUSCH region 1024, a PUSCH region 1026, and a PUSCH region 1028. Subframe type X 1004 may include a PUCCH region 1030, a PUCCH region 1032, a dynamic A/N region 1034, a dynamic A/N region 1036, a PUSCH region 1038, a PUSCH region 1040, and a PUSCH region 1042.

According to certain aspects, a parameter (e.g., Rel-8 may define $N_{PUCCH}$) that defines a starting point of the dynamic ACK/NAK, may be configured to indicate a maximum possible starting points of dynamic ACK/NAK over all subframes for UEs that support dynamic ACK/NACKs (e.g., LTE new UEs as opposed to older UEs, such as legacy UEs that support only LTE Rel-8). A base station may signal the subframe dependent PUCCH region by transmitting this parameter to UEs. Based on this parameter, a UE may determine the resources allocated for the dynamic A/N regions (e.g., dynamic A/N region 1010, dynamic A/N region 1012, dynamic A/N region 1020, dynamic A/N region 1022, dynamic A/N region 1034, dynamic A/N region 1036).

As illustrated, for subframe type U 1000, the UE may recognize an entire set of resources before the dynamic A/N region 1010 as the PUCCH region 1006, while the PUCCH regions for subframes of types N and X may use only a subset of the resources of the PUCCH region 1006 for type U subframes. The other resources may be used for other purposes. For example, the UE may recognize that subframe type N 1002 and subframe type X 1004 include PUSCH regions 1026 and 1040, respectively, between (and non-overlapping with) their PUCCH region and the dynamic A/N region. The region between the actual PUCCH region and the dynamic A/N region (e.g., for subframe type N 1002 and for subframe type X 1004) can be fully used for PUSCH or may be used for some other purpose, for example, as a scheduler choice.

It should be noted that for the example implementation shown in FIG. 10, no additional signaling may be require for UEs that support dynamic ACK/NACK regions (e.g., new UEs), as a UE may simply signal the $N_{PUCCH}$. Moreover, this approach may provide backwards-compatibility as legacy UEs (e.g., Rel-8 UEs) may assume a same division of regions for all subframes (e.g., as provided for subframe type U 1000).

FIG. 11 illustrates a second example implementation for subframe dependent PUCCH regions. Again, depicted subframes include a subframe type U 1100, a subframe type N 1102, and a subframe type X 1104.

In this example implementation, subframe type U 1100 may include a PUCCH region 1106, a PUCCH region 1108, a dynamic A/N region 1110, a dynamic A/N region 1112, a PUSCH region 1114, an additional PUCCH region 1116, and an additional PUCCH region 1118. Subframe type N 1102 may include a PUCCH region 1120, a PUCCH region 1122, a dynamic A/N region 1124, a dynamic A/N region 1126, and a PUSCH region 1128. Subframe type X 1104 may include a PUCCH region 1130, a PUCCH region 1132, a dynamic A/N region 1134, a dynamic A/N region 1136, a PUSCH region 1138, an additional PUCCH region 1140, and an additional PUCCH region 1142.

In this example implementation, the parameter defining the starting point of dynamic ACK/NAK region (e.g., $N_{PUCCH}$), may be set to indicate minimum starting points of the dynamic ACK/NAK regions across all subframes (e.g., for new UEs). Again, a BS may signal the subframe dependent PUCCH region by transmitting this parameter set to the minimum value. Based on this parameter, a UE may determine the resources allocated for the dynamic A/N regions, as illustrated in FIG. 11.

For this example implementation, a base station may also provide one or more additional parameters to indicate the actual PUCCH region (e.g., for additional PUCCH region 1116 and additional PUCCH region 1118 of subframe type U 1100, for additional PUCCH region 1140 and additional PUCCH region 1142 of subframe type X 1104). The additional PUCCH regions may be outside of a prior or existing legacy PUCCH region and the dynamic A/N region. This approach may also allow for backwards compatibility, as legacy UEs may assume a consistent division of regions across all subframes (e.g., as provided for subframe type N 1102).

It should be noted that a dynamic A/N region, if not used completely, may be reused for PUSCH transmissions. By way of another example, when comparing the first design option to the second design option, the first design option may result in less PUSCH resource fragmentation for U subframes, while the second design option may result in less PUSCH resource fragmentation for N subframes.

According to certain aspects, PUCCH region design for multiple subframes may be combined into one type. As an example, PUCCH regions of N and X subframe types may be combined into one subframe type in terms of PUCCH resource management (and share a common set of PUCCH resources). Thus, in this example, there may effectively be two types of subframes: U subframes and N/X subframes for each of the PUCCH region design options described above. Further, for the example implementation shown in FIG. 11, the region of the dynamic A/N region and the additional PUCCH region may also overlap, in a similar manner as with an example implementation shown in FIG. 12.

FIG. 12 illustrates a third example implementation for subframe dependent PUCCH regions. Again, depicted subframes include a subframe type U 1200, a subframe type N 1202, and a subframe type X 1204. In this example implementation, subframe type U 1200 may include a PUCCH region 1206, a PUCCH region 1208, a new dynamic A/N region 1210, a new dynamic A/N region 1212, a PUSCH region 1214, an additional PUCCH region 1216, an additional PUCCH region 1218, a legacy (e.g., Rel-8) dynamic A/N region 1220, and a legacy (e.g., Rel-8) dynamic A/N region 1222. Subframe type N 1202 may include a PUCCH region 1224, a PUCCH region 1226, a dynamic A/N region for all releases of UEs 1228, a dynamic A/N region for all releases of UEs 1230, and a PUSCH region 1232. Subframe type X 1204 may include a PUCCH region 1234, a PUCCH region 1236, a new dynamic A/N region 1238, a new dynamic A/N region 1240, a PUSCH region 1242, an additional PUCCH region 1244, an additional PUCCH region 1246, a legacy (e.g., Rel-8) dynamic A/N region 1248, and a legacy (e.g., Rel-8) dynamic A/N region 1250.

With the example implementations shown in FIGS. 10 and 11 that legacy (e.g., Rel-8) UEs may be scheduled to transmit in U subframes and X subframes. However, if legacy UEs are never (or rarely) scheduled in these types of subframes, various potential optimizations may be supported.

For example, if legacy UEs support dynamic A/N, CQI, SR and SPS A/N new UEs may share the same resource block(s) (RB(s)). As shown, additional PUCCH region 1216 and Rel-8 dynamic A/N region 1220 may share RB(s), and additional PUCCH region 1218 and Rel-8 dynamic A/N region 1222 may share RB(s) in subframe type U 1200. Further, additional PUCCH region 1244 and Rel-8 dynamic A/N region 1248 may share RB(s), and additional PUCCH region 1246 and Rel-8 dynamic A/N region 1250 may share RB(s) in subframe type X 1204.

This sharing may be accomplished via orthogonalization of resources for different control information in the same RB, for example, using different cyclic shifts and/or orthogonal covers. Further, a scheduling function may select a starting Control Channel Elements (CCE) of a Physical Downlink Control Channel (PDCCH) scheduling Physical Downlink Shared Channel (PDSCH) transmissions, such that the implicitly derived dynamic A/N uplink resource (with a UE deriving the A/N uplink resource based on the starting CCE and $N_{PUCCH}$) does not collide with CQI, SR, and SPS A/N resources of new UEs. If the number of Rel-8 UEs to be scheduled is very limited, such scheduling restrictions may be tolerated.

As another example, dynamic A/N resources for new UEs may start differently than for Rel-8. In this manner, the region for dynamic A/N resource for new UEs may or may not collide with the region for Rel-8 dynamic A/N. Further, the same RB may be shared between A/N and CQI. Such sharing may be provided using mixed RBs as defined in Rel-8 via parameter Ncs(1), which may indicate a number of cyclic shifts used for A/N/SR on a mixed RB. For instance, Ncs(1)=0 may indicate no mixed RBs. Otherwise, this parameter may define a number of cyclic shifts used for A/N/SR in the mixed RB. For certain implementations, sharing CQI with Rel-8 dynamic A/N may be disallowed, for example, to reduce complexity.

As another example, a Rel-8 dynamic A/N region may share RBs with a new A/N/SR (dynamic A/N and/or SPS A/N) region. In this case, a parameter controlling PUCCH A/N capacity and performance tradeoff (e.g., $\Delta_{shift}^{PUCCH}$, which takes values of 1, 2, and 3) may be set to a large value to facilitate multiplexing.

Various signaling may be utilized to accomplish the above-described implementation examples. For example, $N_{PUCCH}$ may be set to denote a minimum PUCCH region over all subframe types and an additional PUCCH region (in addition to that indicated by $N_{PUCCH}$) may be indicated to new UEs. In addition to a CQI region parameter, as defined via layer 3 parameter providing a number of resource blocks used for PUCCH format 2/2a/2b in Rel-8 (e.g., NRB), new UEs may also be provided another parameter to define the CQI region in the additional PUCCH region.

In some cases, the example implementation shown in FIG. 12 and described above may provide optimized PUSCH resource utilization when compared with the example implementations shown in FIGS. 10 and 11. However, this optimization may rely on additional scheduling restrictions for Rel-8 UEs and additional signaling requirements for new UEs.

In any case, by utilizing subframe dependent PUCCH resource allocation, efficient use of UL resources in U and shared X subframes, where legacy (e.g., Rel-8) and new UEs are likely to co-exist, may be achieved. For any UE newly admitted into the system, it may be preferable to provide for robust PUCCH transmissions via increased PUCCH regions in protected U subframes first, before using shared X subframes.

The scenarios and embodiments described herein may be applied to any heterogeneous network (HetNet), including, but not limited to, Femto-to-Femto network, Macro-to-Pico network and/or any other type of HetNet where the interfered BS may implement any of the functions described herein.

The techniques described herein may be implemented using any suitable means, which may include any suitable combination of hardware and/or software components. In one aspect, the aforementioned means may comprise processor(s), such as those described in connection with the Figures, configured to perform the functions described above. In another aspect, the aforementioned means may comprise a module or any apparatus configured to perform the functions recited by the aforementioned means.

The terms "module", "component," and the like, are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Those skilled in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or combinations of both, depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in random access memory (RAM), read only memory (ROM), programmable ROM (PROM), electrically programmable ROM (EPROM), electrically erasable ROM (EEPROM), registers, hard disk, a removable disk, a CD-ROM, or any other form of storage medium known in the art. By way of illustration and not limitation, RAM is available in many forms such as synchronous RAM (SRAM), dynamic RAM (DRAM), static DRAM (SDRAM), double data rate SDRAM (DDR SDRAM), enhanced SDRAM (ESDRAM), Synclink DRAM (SLDRAM) and direct Rambus RAM (DRRAM). An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for allocating uplink resources in a wireless communications network, comprising:
    determining an allocation of physical uplink control channel (PUCCH) resources of a subframe based, at least in part, on whether transmissions in a first cell are protected by restricting transmissions in a second cell; and
    signaling the resource allocation to a user equipment (UE).

2. The method of claim 1, wherein determining the allocation of PUCCH resources of the subframe comprises determining at least one of a location or a size of a region for the allocation of PUCCH resources of the subframe.

3. The method of claim 1, wherein:
    the wireless communications network comprises a heterogeneous network; and
    the first and second cells are of different power class types.

4. The method of claim 1, wherein signaling the resource allocation to the UE comprises signaling an indication of a starting point for a dynamic region for transmitting acknowledgements.

5. The method of claim 1, wherein the allocation of PUCCH resources of the subframe are based, at least in part, on a subframe type of a plurality of subframe types, where the plurality of subframe types comprise at least a first type in which transmissions in a first cell are protected by restricting transmissions in a second cell.

6. The method of claim 5, wherein:
    the plurality of subframe types comprise at least second and third types; and
    a common set of PUCCH resources are allocated to subframes of the second and third types.

7. The method of claim 5, wherein signaling the resource allocation to the UE comprises signaling an indication of a starting point for a dynamic region for transmitting acknowledgements.

8. The method of claim 7, wherein:
    the indication is set to a maximum value;
    the allocated PUCCH resources of a subframe of the first type utilize a first region defined by the maximum value; and
    the allocated PUCCH resources of a subframe of a second type utilize a second region that comprises a subset of resources of the first region.

9. The method of claim 8, wherein resources of a third region are allocated for a physical uplink shared channel (PUSCH) in the subframe of the second type, wherein the third region comprises a subset of resources of the first region and is non-overlapping with the second region.

10. The method of claim 7, wherein:
the indication is set to a minimum value; and
the allocated PUCCH resources of a subframe of the first type comprise resources in a first region defined by the minimum value and a second region that is outside the first region and outside the dynamic region for transmitting acknowledgements.

11. The method of claim 5, wherein:
the UE is of a first type; and
allocated PUCCH resources of the UE in subframes of at least the first type are shared with resources allocated for a dynamic region for transmitting acknowledgements by a UE of a second type.

12. The method of claim 11, wherein allocated PUCCH resources of the UE in subframes of at least the second type are not shared with resources allocated for a dynamic region for transmitting acknowledgements by the UE of the first or second type.

13. The method of claim 11, further comprising:
scheduling a starting control channel element (CCE) of a physical downlink control channel (PDCCH) for the UE of the second type such that a dynamic acknowledgement resource derived based on the starting CCE does not collide with resources shared with PUCCH resources allocated to the UE of the first type.

14. The method of claim 11, further comprising:
signaling a minimum PUCCH region allocated for subframes of at least the first and a second subframe type; and
signaling an additional PUCCH region allocated for subframes of at least the first subframe type.

15. A method for determining allocated uplink resources in a wireless communications network, comprising:
determining an allocation of physical uplink control channel (PUCCH) resources of a subframe based, at least in part, on whether transmissions in a first cell are protected by restricting transmissions in a second cell; and
transmitting, in the subframe, information to a base station of the first cell using the allocated PUCCH resources.

16. The method of claim 15, wherein determining the allocation of PUCCH resources of the subframe comprises determining at least one of a location or a size of a region for the allocation of PUCCH resources of the subframe.

17. The method of claim 15, wherein:
the wireless communications network comprises a heterogeneous network; and
the first and second cells are of different power class types.

18. The method of claim 15, further comprising receiving, from a base station of the first cell, an indication of a starting point for a dynamic region for transmitting acknowledgements.

19. The method of claim 15, wherein the allocation of PUCCH resources of the subframe are based, at least in part, on a subframe type of a plurality of subframe types, where the plurality of subframe types comprise at least a first type in which transmissions in a first cell are protected by restricting transmissions in a second cell.

20. The method of claim 19, wherein:
the plurality of subframe types comprise at least second and third types; and
a common set of PUCCH resources are allocated to subframes of the second and third types.

21. The method of claim 19, further comprising receiving, from a base station of the first cell, an indication of a starting point for a dynamic region for transmitting acknowledgements.

22. The method of claim 21, wherein:
the indication is set to a maximum value;
the allocated PUCCH resources of a subframe of the first type utilize a first region defined by the maximum value; and
the allocated PUCCH resources of a subframe of a second type utilize a second region that comprises a subset of resources of the first region.

23. The method of claim 22, wherein resources of a third region are allocated for a physical uplink shared channel (PUSCH) in the subframe of the second type, wherein the third region comprises a subset of resources of the first region and is non-overlapping with the second region.

24. The method of claim 21, wherein:
the indication is set to a minimum value; and
the allocated PUCCH resources of a subframe of the first type comprise resources in a first region defined by the minimum value and a second region that is outside the first region and outside the dynamic region for transmitting acknowledgements.

25. The method of claim 19, wherein:
the UE is of a first type; and
allocated PUCCH resources of the UE in subframes of at least the first type are shared with resources allocated for a dynamic region for transmitting acknowledgements by a UE of a second type.

26. The method of claim 25, wherein allocated PUCCH resources of the UE in subframes of at least the second type are not shared with resources allocated for a dynamic region for transmitting acknowledgements by the UE of the first or second type.

27. The method of claim 25, further comprising:
Receiving on a physical downlink control channel (PDCCH) for the UE of the second type; and
deriving a dynamic acknowledgement resource based on a starting control channel element (CCE) of the PDCCH, wherein the starting CCE is scheduled such that the derived dynamic acknowledgement resource does not collide with resources shared with PUCCH resources allocated to the UE of the first type.

28. The method of claim 25, wherein the determining comprises:
receiving, from the base station of the first cell, an indication of a minimum PUCCH region allocated for subframes of at least the first and a second subframe type and an indication of an additional PUCCH region allocated for subframes of at least the first subframe type.

29. An apparatus for allocating uplink resources in a wireless communications network, comprising:
at least one processor configured to:
determine an allocation of physical uplink control channel (PUCCH) resources of a subframe based, at least in part, on whether transmissions in a first cell are protected by restricting transmissions in a second cell;
a transmitter configured to signal the resource allocation to a user equipment (UE); and
a memory coupled to the at least one processor.

30. An apparatus for allocating uplink resources in a wireless communications network, comprising:

at least one processor configured to:
determine an allocation of physical uplink control channel (PUCCH) resources of a subframe based, at least in part, on whether transmissions in a first cell are protected by restricting transmissions in a second cell;
a transmitter configured to transmit, in the subframe, information to a base station of the first cell using the allocated PUCCH resources; and
a memory coupled to the at least one processor.

* * * * *